US005416126A

United States Patent [19]

Murphy et al.

[11] Patent Number: 5,416,126

[45] Date of Patent: * May 16, 1995

[54] COMPOSITION WHICH IS CURED BY EXPOSURE TO ULTRAVIOLET LIGHT IN THE ABSENCE OF SOLVENT

[75] Inventors: Edward J. Murphy, Arlington Heights; Edward P. Zahora, Naperville; Sami A. Shama, Hoffman Estates, all of Ill.

[73] Assignee: DSM N.V., Netherlands

[ * ] Notice: The portion of the term of this patent subsequent to Aug. 2, 2011 has been disclaimed.

[21] Appl. No.: 19,365

[22] Filed: Feb. 17, 1993

Related U.S. Application Data

[62] Division of Ser. No. 714,856, Jun. 13, 1991, Pat. No. 5,207,871.

[51] Int. Cl.$^6$ ........................ C08F 2/50; C08F 263/06; B32B 27/10

[52] U.S. Cl. ........................................ 522/33; 522/42; 522/64; 522/104; 522/107; 522/108; 526/328; 526/328.5; 428/481; 428/482; 428/375

[58] Field of Search .................... 522/107, 42, 64, 104, 522/108, 33; 528/306; 526/328.5, 328; 428/481, 482, 375

[56] References Cited

U.S. PATENT DOCUMENTS

| | | | |
|---|---|---|---|
| 3,874,376 | 4/1975 | Dart et al. | 522/107 |
| 3,898,144 | 8/1975 | Rudolph et al. | 522/107 |
| 4,038,340 | 7/1977 | Frank et al. | 528/306 |
| 4,112,146 | 9/1978 | Lazear | 522/107 |
| 4,187,257 | 2/1980 | Nielsen | 522/107 |
| 4,265,723 | 5/1981 | Hesse et al. | 522/107 |
| 4,295,907 | 10/1981 | Cordts et al. | 522/107 |
| 4,775,597 | 10/1988 | Birkmeyer et al. | 522/108 |
| 4,845,265 | 7/1989 | Lapin et al. | 522/107 |
| 4,857,434 | 8/1989 | Klinger | 522/107 |
| 5,055,354 | 10/1991 | Simcoke | 428/342 |
| 5,118,783 | 6/1992 | Raju | 528/306 |
| 5,254,603 | 10/1993 | Nahm | 522/107 |
| 5,334,456 | 8/1994 | Noren et al. | 522/107 |

FOREIGN PATENT DOCUMENTS

| | | | |
|---|---|---|---|
| 1235410 | 10/1986 | Japan | 522/107 |
| WO90/0512 | 2/1990 | WIPO | 522/107 |

*Primary Examiner*—Susan W. Berman

*Attorney, Agent, or Firm*—Dressler, Goldsmith, Shore & Milnamow, Ltd.

[57] ABSTRACT

A composition which is cured upon exposure to ultraviolet light in the absence of solvent is disclosed. The liquid composition is prepared by combining a liquid maleate polyester and at least one of a vinyl compound and an allyl functional compound. A photoinitiator is then added to the polymerizable liquid composition. A substrate is impregnated with the polymerizable liquid composition and exposed to actinic energy of a sufficient dosage for a sufficient amount of time to polymerize the composition to a sufficient degree to impart useful properties to the substrate. The composition can be used as a binder for fiberglass insulation, in the manufacture of transparent or semi-transparent paper and to manufacture paper for use in photocopy machines.

9 Claims, No Drawings

COMPOSITION WHICH IS CURED BY EXPOSURE TO ULTRAVIOLET LIGHT IN THE ABSENCE OF SOLVENT

This application is a division of application Ser. No. 07/714,856, filed Jun. 13, 1991, now U.S. Pat. No. 5,207,871.

FIELD OF THE INVENTION

The invention is directed to a composition which is cured upon exposure to ultraviolet light in the absence of solvent.

BACKGROUND

There are a multitude of compositions which are applied to an article in liquid form and, when cured, polymerize to provide the article with a protective coating or otherwise impart useful properties to the article. Many of these compositions are viscous and require the addition of an organic solvent to reduce their viscosity so that the compositions can be evenly and effectively applied to the article. The organic solvents typically evaporate when the composition is cured, however, especially when heat is used to cure the compositions. The fumes from the organic solvents must then be recovered. Recovery and disposal of these fumes is expensive.

Polymerizable compositions that have a low viscosity without the addition of an organic solvent are obviously preferable in those applications when low viscosity is a desirable characteristic of the composition. The compositions are easily and accurately applied, and no difficulty or expense in controlling solvent fumes is encountered. Polymerizable compositions which can be cured using a more energy efficient curing mechanism, such as ultraviolet light, are also desirable. A polymerizable composition which can be cured by a solventless ultraviolet light cure process can be applied economically and accurately and, when cured, imparts useful properties to an article.

SUMMARY OF THE INVENTION

A liquid maleate polyester and at least one of a liquid vinyl monomer, oligomer or polymer and an allyl functional compound are combined to form a polymerizable liquid mixture.

A photoinitiator is then added to the liquid mixture. The liquid maleate polyester in the polymerizable liquid preferably has at least two maleate functional groups. The maleate polyester is preferably a substantially linear polyester that is end-capped with maleate functional groups, one maleate functional group being at each end of the maleate-functional oligomer. Maleate polyesters suitable for use in the coating process and composition of the present invention have a molecular weight of about 400 to about 5000, preferably about 400 to about 1000.

The liquid maleate polyester is combined with at least one of a vinyl ether or vinyl ester compound and an allyl functional compound, preferably a triallyl cyanurate. Compositions containing the three components are combined in amounts so that the mole ratio is in the range of about 1:2:1 to about 2:1:2, wherein the maleate polyester, the multifunctional vinyl compound and the allyl functional compound are represented in any order in the ratio. Compositions containing only the maleate polyester and the allyl functional compound are combined in amounts sufficient to produce a mole ratio of maleate polyester to allyl functional compound in the range of about 1:3 to about 2:3 and compositions containing only the maleate polyester and the vinyl functional compound are combined in amounts sufficient to produce a mole ratio of maleate polyester to vinyl functional component in the range of about 1.2:1 to about 1:1.2.

The photoinitiator that is added to the liquid monomer mixture is preferably a ketonic photoinitiator. About 2 to about 10 parts by weight of the ketonic photoinitiator are added to the liquid monomer mixture to provide the ultraviolet curable liquid mixture that is applied to the paper stock.

The liquid mixture can be applied onto a variety of substrates and cured according to the disclosed process to provide a variety of useful articles. For example, the mixture can be applied onto a commercial drafting paper stock and cured thereon to produce semi-transparent paper used for architectural drawings and as a transparent window for envelopes. Filter paper is produced by applying the mixture to corrugated paper and then curing the mixture thereon. The liquid mixture can also be used to water proof and/or strengthen paper and cardboard products according to the disclosed process. The liquid mixture can also be used as binder in fiberglass insulation by applying the liquid mixture to a fiberglass web and exposing the resulting coated web to ultraviolet light. The liquid mixture can also be used to manufacture paper suited for use in photocopy machines. The photocopy paper that results does not smoke or emit fumes as does paper currently used in photocopy machines. The liquid mixture can also be applied to glass fiber or porous plastic substrates and then cured thereon to impart useful properties to these substrates.

The liquid mixture is used to impregnate a substrate such as paper stock, fiberglass insulation, and the like. The substrate is preferably porous. The substrate can be impregnated by any known means that is suitable for introducing liquid into a porous substrate.

The impregnated substrate is then exposed to actinic energy whereupon the photoinitiator initiates polymerization of the mixture. A dosage of ultraviolet light of about 0.1 joule/$cm^2$ to about 2 joules/$cm^2$, preferably about 0.2 joule/$cm^2$ to about 1 joule/$cm^2$ is sufficient to polymerize the liquid mixture. Polymerization of the liquid mixture cures the impregnated substrate resulting in a substrate with desirable properties.

DESCRIPTION OF THE PREFERRED EMBODIMENT

The composition of the present invention is applied to a substrate such as commercial drafting paper stock, fiberglass webs, photocopy paper stock, or other suitable porous substrates and polymerized to provide useful properties to the substrate. The composition, when applied to commercial drafting paper stock and cured, provides a degree of transparency to the paper. The composition, when applied to photocopy paper stock and cured, provides photocopy paper which does not smoke or give off fumes when used. The composition is also useful as a binder in fiberglass insulation. The composition is applied to a fibrous fiberglass web and cured in situ.

The composition is a liquid mixture of a maleate functional polyester resin and at least one of a vinyl ether or ester compound and an allyl functional compound such as a triallyl cyanurate. The composition also contains a ketonic photoinitiator that can be added to the mixture at any time prior to use. The polymerizable liquid mixture is impregnated into commercial drafting paper stock according to the process disclosed herein to produce transparent or semi-transparent papers.

Most of the commercially available maleate polyesters are suitable for use in the composition and process of the present invention. Maleate polyesters with a molecular weight of about 400 to about 5000 are particularly suitable. Maleate polyesters with a molecular weight of about 400 to 1000 are preferred. The polyesters are maleate functional, i.e. the only reactive groups on the polymer are maleate groups. The preferred maleate-functional polyesters have a functionality of about 2, which means that each molecule has two maleate functional groups thereon. A single maleate functional group is preferably at each of the two ends of the polyester molecule, so that the polyester molecule is end-capped with the maleate functional groups.

A maleate polyester preferred for use in the composition of the present invention is typically manufactured by a sequential reaction. Initially, equimolar amounts of maleic anhydride and butyl carbinol are reacted. The reaction preferably takes place at an elevated temperature in a nitrogen atmosphere, but at a temperature that is less than 110° C. The product from this reaction is then reacted with a reactive diol such as 1,5-pentanediol. The sequential reaction takes place in a xylene medium at a temperature of about 140° C. to about 190° C. and at ambient pressure.

Other reactive diols can be utilized such as aliphatic polyhydric alcohols that contain 2 to 10 carbon atoms, more preferably 3 to about 6 carbon atoms, and are illustrated by ethylene glycol, butylene glycol, ester diol, 1,6-hexane diol, glycerol, trimethylol propane, pentaerythritol, and sorbitol. Trimethylol propane is a particularly preferred reactive diol.

Vinyl ethers suitable for use in the present invention can be represented by the following general Formula I:

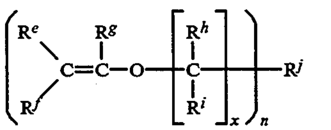

(I)

wherein $R^e$, $R^f$, $R^g$, $R^h$, and $R^i$ are each independently selected from the group of hydrogen and lower alkyl groups containing 1 to 4 carbon atoms; $R^e$ or $R^f$ and $R^g$ joined together can be part of a ring structure; $R^e$ or $R^f$ and $R^h$ or $R^i$ joined together can be part of a ring structure; and $R^g$ and $R^h$ or $R^i$ joined together can be part of a ring structure; $R^j$ is an aromatic or aliphatic group that is reactive only at the site(s) where a vinyl ether containing radical is bound; x is 0 or 1; and n is equal to 1 to 10, preferably 1 to 4, provided that n is less than or equal to the number of reactive sites of $R^j$.

$R^j$ can contain heteroatoms, i.e., atoms other than carbon atoms, such as oxygen, nitrogen, sulfur, silicon, phosphorus, and mixtures of heteroatoms alone or in combination with carbon atoms. $R^j$ can contain 1 to about 20, preferably 1 to about 10, atoms. $R^j$ is preferably a straight or branched carbon containing group containing 1 to about 8, more preferably 1 to about 4, carbon atoms and can preferably contain oxygen atoms.

Representative of vinyl ethers of Formula I are dihydropyran and dimethyl benzene divinyl ether.

Preferred vinyl ethers for use in the transvinylation reaction can be represented by the following general Formula II:

$$(CH_2{=}CH{-}O{-}CH_2)_{\overline{n}}R^k \qquad (II)$$

wherein $R^k$ is an aliphatic group that is reactive only at the site(s) where a vinyl ether containing radical is bound and n is equal to 1 to 4.

$R^k$ contains at least one carbon atom and can contain heteroatoms and mixtures of heteroatoms. Preferably, $R^k$ contains 1 to about 4 carbon atoms and can contain oxygen atoms.

Vinyl ethers having the structure of Formula II are illustrated by divinyl ethers, such as 1,4-butane diol divinyl ether, 1,6-hexane diol divinyl ether, and triethylene glycol divinyl ether. Polyvinyl ethers of higher functionality are illustrated by trimethylol propane trivinyl ether and pentaerythritol tetravinyl ether.

Illustrative monovinyl ethers having the structure of Formula II are ethyl vinyl ether, methyl vinyl ether, n-butyl vinyl ether, phenyl vinyl ether and the like.

The vinyl monomer is preferably either a vinyl ether or a vinyl ester that has more than one vinyl functional group per molecule. An example of a suitable multifunctional vinyl compound useful in the present invention is the divinyl ether of triethylene glycol represented by Formula III:

$$CH_2{=}CHO(CH_2CH_2O)_3CH{=}CH_2 \qquad (III)$$

which can be commercially obtained as DVE-3 from the GAF Corporation or 1,4-cyclohexanedimethanol divinyl ether.

Suitable vinyl functional esters are Vectomer 4010 and 4020 which can be commercially obtained from Allied-Signal, Inc. Vectomer 4010 is an isopthalate ester of hydroxy butyl-vinyl ether that has a molecular weight of 362 and Vectomer 4020 is a glutarate ester of 1,4-cyclohexanedimethanol divinyl ether that has a molecular weight of 436.

Other suitable vinyl ethers include the vinyl ether aliphatic and aromatic oligomers that can be commercially obtained as Vectomer 2010, 2015 and 2020 from Allied Signal, Inc.

Examples of allylic monomers suitable for use in the present invention include triallyl cyanurates, a specific example of which is 2,4,6-triallyloxy-1,3,5-triazine. This compound can be commercially obtained as CYLINK TAC from American Cyanamid Co. Other suitable allylic compounds include diallyl phthalate and triallyl trimellitate.

When the maleate polyester, multi-functional vinyl monomer and allyl functional compound are present in the liquid mixture, the mole ratio of any two components of the mixture is about 2:1 to about 1:2. Overall mole ratios of the three components in the mixture are about 1:2:1 to about 2:1:2 wherein the maleate polyester, the multi-functional vinyl monomer and the allyl functional compound are represented in the ratio in any order.

When only the maleate and the allyl functional compounds are present in the liquid mixture the mole ratio of maleate to allyl functional compound is in the range of about 1:3 to about 2:3. When only the maleate and the vinyl ether are present in the composition, the mole ratio of maleate to vinyl ether is in the range of about 1.2:1 to about 1:1.2, preferably about 1:1.

The maleate polyester is then polymerized with the vinyl and/or allyl compound by radical-initiated polymerization.

A photoinitiator which initiates radiation polymerization upon exposure of the polymerizable liquid mixture to actinic energy such as light in or near the ultraviolet and visible ranges, e.g., light having a wavelength of about 200 to about 600 nanometers, is added to the liquid mixture. Suitable photoinitiators are ketonic, and can be aromatic, such as benzophenone. Darocur 1173 is a suitable benzyl ketal-based photoinitiator commercially available from EM Industries and contains 2-hydroxy-2-methyl-1-phenylpropan-1-one as the active ingredient. An aryl ketone photoinitiator that contains hydroxycyclohexylphenyl ketone as the active ingredient is also suitable. This aryl ketone photoinitiator is commercially available as Irgacure 184 from the Ciba Geigy Corp. Acyl phosphine oxides such as 2,4,6-trimethylbenzoyl diphenyl phosphine oxide available as Lucerin TPO from BASF can also be utilized. UVI 6990 or UVI 6974, cationic photoinitiators can also be used in the polymerizable compositions disclosed herein to promote polymerization.

At least one photoinitiator is present in an amount of about 1 to about 10 weight percent in the liquid mixture based on the total weight of the liquid mixture.

When it is desired to manufacture transparetized paper, the polymerizable liquid mixture is applied to standard commercial drafting paper stock using wire wound drawdown bars or any other equivalent method as would be recognized by one skilled in the art to impregnate the paper stock with the polymerizable liquid mixture.

The amount of the polymerizable liquid mixture used to impregnate the paper stock controls the degree to which the paper, when cured, is transparent. The viscosity of the polymerizable mixture enables it to penetrate the paper stock rapidly and uniformly, which provides a paper which is transparent to a uniform degree. This is particularly useful in applications such as architectural drawings, where the degree and uniformity of transparency are product specifications.

The paper stock is impregnated with about 0.002 gram to about 0.01 gram of the polymerizable liquid per square inch for a standard thickness paper. Preferably about 0.004 gram to about 0.008 gram of liquid mixture is used per square inch to impregnate the paper stock. Most preferably, about 0.005 gram of the polymerizable mixture is applied per square inch of the paper stock. For thicker papers, a greater amount of the liquid mixture must be impregnated per square inch of the paper stock to achieve an equivalent degree of transparency.

The liquid mixture has a viscosity of about 10 cps to about 500 cps, preferably about 10 cps to about 100 cps. Due to the low viscosity of the liquid mixture, the paper is impregnated with the liquid mixture very quickly, i.e., less than about 180 seconds, preferably less than about 60 seconds. The impregnation is usually carried out at room temperature, but may be accelerated by exposing the coated paper to mild convection heating at temperatures in the range of about 130° F. to about 250° F. Alternatively, impregnation can be accelerated by mildly heating the liquid as it is applied to temperatures in the range of about 100° F. to about 160° F.

The impregnated paper stock is then cured using a standard ultraviolet curing unit. The paper stock is cured by polymerizing the mixture used to impregnate the paper stock. The liquid mixture is polymerized by exposure to ultraviolet light. A suitable ultraviolet curing unit can be obtained from Fusion Systems of Rockville, Md. The amount of ultraviolet radiation sufficient to polymerize the liquid mixture used to impregnate paper stock and, thus, cure the paper stock, is about 0.1 joule/$cm^2$ to about 2 joules/$cm^2$. Preferably, the amount of ultraviolet radiation sufficient to polymerize the liquid mixture used to impregnate the paper stock is about 0.2 joule/$cm^2$ to about 1 joule/$cm^2$.

The present invention is illustrated by the following representative examples.

EXAMPLE 1

A maleate polyester was prepared by reacting maleic anhydride (1 mole) with butyl carbitol (1 mole). The reaction product was then reacted with 1,5-pentanediol (0.5 mole). A resinous liquid polyester end-capped with maleate functional groups, one on each end, resulted. The theoretical molecular weight of the resinous polyester was about 588.

The resinous liquid polyester was combined into separate liquid mixtures, as enumerated in Table 1 hereinbelow. The resinous liquid polyester is designated as olig. 20201U7 in Table 1.

TABLE 1

| Composition | 1 | 2 | 3 | 4 | 5 | 6 | 7 | 8 | 9 |
|---|---|---|---|---|---|---|---|---|---|
| Olig. 20201U7 | 66 | 73.3 | 68.06 | 75.6 | 64 | 67 | 69.2 | 74 | 51 |
| Triallyl Cyanurate | 28 | 20.7 | 28.88 | 21.35 | 36 | — | — | — | 14 |
| Divinyl Ether | — | — | — | — | — | — | — | 26 | 35 |
| Darocur 1173 | 5.94 | 5.94 | 3 | 2.99 | 6 | 4.94 | 4.94 | 6 | 6 |
| FC 430 | 0.01 | 0.01 | 0.01 | 0.01 | 0.01 | 0.01 | 0.01 | — | — |
| BHT | 0.05 | 0.05 | 0.05 | 0.05 | 0.05 | 0.05 | 0.05 | — | — |
| Diallyl phthatate | — | — | — | — | — | 28 | — | — | — |
| Triallyl trimellitate | — | — | — | — | — | — | 25.8 | — | — |
| Maleate/allyl molar ratio | 1:1 | 2:3 | 1:1 | 2:3 | 1:3 | 2:3 | 2:3 | | |
| Minimum Cure Dose(j/$cm^2$) | 1 | 1.5 | 1.5 | 1.5 | 0.5 | >2 | 2 | 0.5 | 0.5 |
| Odor during cure | mild | mild | mild | mild | mild | mild | mild | mild | mild |
| Cured film appearance | clear | clear | clear | clear | clear | clear | clear | clear | clear |

All compositions were applied to standard drafting paper stock using wire wound drawdown bars. About 0.005 gram of each of the compositions were applied per square inch of paper stock. While all compositions were suitable, Composition 9, which impregnated the paper stock in about 45 seconds, showed the highest impregnation speed.

Several samples of paper stock such as Crane and Esleeck Vellum, 15.5 lb. and 17.5 lb. weight, were impregnated with each of the compositions described in Table 1. These samples were then exposed to ultraviolet light to polymerize the liquid mixture which was used to impregnate the samples. A standard ultraviolet light cure unit was used. The cure unit was obtained from Fusion Systems of Rockville, Md. The samples of impregnated paper stock were exposed to varying dosages of ultraviolet light as set forth in Table 2 below. The samples were then weighed and extracted at room temperature in an organic solvent, methyl ethyl ketone, for 15 minutes. The samples were then dried and reweighed. The percent by weight extractable components of compositions 8 and 9 were markedly different after exposure to identical amounts of ultraviolet light. The difference was especially noticeable in the samples which were exposed to lower dosages of ultraviolet light (0.2 to 0.8 joule/$cm^2$). These results are reported in Table 2 below.

TABLE 2

EXTRACTABLE AMOUNTS OF POLYMERIZED MIXTURES AT VARIOUS CURE DOSAGES

| Ultraviolet Light | 4 Extractables (MEK) | |
|---|---|---|
| Dosage (joules/$cm^2$) | Composition 8 | Composition 9 |
| 0.2 | 8 | 2 |
| 0.4 | 3.5 | 1.5 |
| 0.6 | 2 | 1.2 |
| 0.8 | 1.5 | 1 |
| 1 | 1 | 1 |

Table 2 demonstrates that composition 9 polymerized more completely at lower dosages of ultraviolet light than composition 8, which did not contain triallyl cyanurate.

Additional compositions of the present invention were prepared and evaluated by conventional procedures.

In Table 3 below, various compositions containing diethyl maleate polyester and an isophthalate ester of hydroxybutyl vinyl ether (Vectomer 4010) either alone or in combination with another vinyl ether oligomer (Vectomer 2015) were prepared. The data in Table 3 show that a mole ratio of diethyl maleate to vinyl ether of about 1:1 is optimal.

TABLE 3

| Composition | V1 | V2 | V3 (Control) | V4 | V5 | V6 |
|---|---|---|---|---|---|---|
| Vectomer 2015 (VE) | — | 6.5 | — | — | — | — |
| Vectomer 4010 (VE) | 49.73 | 27.82 | 98.94 | 49.73 | 49.73 | 49.73 |
| Diethyl Maleate | 47.21 | 62.62 | — | 47.21 | 47.21 | 47.21 |
| Darocur 1173 | 3 | 3 | — | 3 | — | 3 |
| FC 430 | 0.01 | 0.01 | 0.01 | 0.01 | 0.01 | 0.01 |
| BHT | 0.05 | 0.05 | 0.05 | 0.05 | 0.05 | 0.05 |
| UVI 6974 | — | — | 1 | 0.2 | — | 0.02 |
| Lucirin TPO | — | — | — | — | 2 | 1 |
| Minimum Cure Dose (j/sq.cm) | 1 | >2 | 1 | >2 | >1 | 0.5 |
| Odor during cure | +++ | +++ | ++ | +++ | ++ | +++ |
| Cured film appearance | clear | clear | dark | dark | clear | clear |

TABLE 3-continued

| Composition | V1 | V2 | V3 (Control) | V4 | V5 | V6 |
|---|---|---|---|---|---|---|
| MEK extractables at cure dose | — | — | — | — | 64% | 19% |
| Maleate/ VE molor ratio | 1.03:1 | 2.4:1 | | 1.03:1 | 1.03:1 | 1.03:1 |

In Table 4 below, other compositions containing Vectomer 4010, DVE-3 and diethyl maleate polyester were prepared. While the most rupture resistant cured film is obtained using UVI 6974 photoinitiator, a strong odor is produced and a brown film results. Of the diethyl maleate polyester-containing films in Table 4, the film with the 1:1 vinyl ether to maleate ratio (composition V8) was the most rupture resistant.

TABLE 4

| | V7 | V8 | V9 | V10 | V11 |
|---|---|---|---|---|---|
| Vectomer 4010 | 80 | 37.32 | 39.31 | 35.29 | 99.4 |
| DVE-3 | 19.3 | 9.33 | 9.83 | 8.82 | — |
| Diethyl Maleate | — | 51.35 | 48.86 | 53.89 | — |
| Darocur 1173 | — | 3 | 3 | 3 | — |
| Lucirin TPO | — | 1 | 1 | 1 | — |
| UVI 6974 | 0.7 | — | — | — | 0.6 |
| Vinyl ether/ maleate ratio | — | 1.1 | 1.11:1 | 1:1.11 | — |
| Odor during cure | ++++ | ++ | ++ | ++ | ++++ |
| Film Color | Brown | Clear | Clear | Clear | Brown |
| MEK rupture time | | | | | |
| @ 0.5 J | >15 min. | uncured | uncured | uncured | >15 min. |
| @ 1.0 J | >15 min. | 12 sec. | 8 sec. | 8 sec. | >15 min. |
| @ 1.5 J | >15 min. | 137 sec. | 80 sec. | 9 sec. | >15 min. |

In Table 5 below, other compositions containing Vectomer 4010 and a maleate oligomer were prepared. All of the compositions were cured by exposing them to a radiation dosage of 0.5 J/sq.cm. While compositions V12, V13 and V14 all had good characteristics, V13 had the least odor.

TABLE 5

| | V12 | V13 | V14 | V15 |
|---|---|---|---|---|
| Vectomer 4010 | 51.3 | 38 | 39 | 40.7 |
| Oligomer 20201U7 | — | 61.9 | 42.5 | 50 |
| Diethyl Maleate | 48.7 | — | 18.5 | 9.4 |
| FC430 | 0.01 | 0.01 | 0.01 | 0.01 |
| Darocur 1173 | 3 | 3 | 3 | 3 |
| Lucirin TPO | 3 | 3 | 3 | 3 |
| Maleate to VE Molar ratio | 1:1 | 1:1 | 1.2:1 | 1:1 |
| Liquid | | | | |
| Color | Light Yellow | Yellow | Yellow | Yellow |
| Appearance | clear | clear | clear | clear |
| | 4.7% | 4.3% | 2.4% | 12.0% |

Additional compositions were prepared using the ingredients as set forth in Table 6 below.

TABLE 6

| | V16 | V17 | V18 | V19 |
|---|---|---|---|---|
| Oligomer 20201U7 | 64.00 | 60.34 | 58.4 | 48.1 |

TABLE 6-continued

| | V16 | V17 | V18 | V19 |
|---|---|---|---|---|
| Triallyl Cyanurate | 36.00 | 33.94 | — | 13.2 |
| Vectomer 4010 | — | — | 35.9 | — |
| DVE-3 | — | — | — | 33 |
| FC 430 | 0.01 | 0.01 | 0.01 | 0.01 |
| BHT | 0.05 | 0.05 | 0.05 | — |
| Darocur 1173 | 3.00 | 2.83 | 2.82 | 1.9 |
| Lucirin TPO | 3.00 | 2.83 | 2.82 | 3.8 |
| Phenothiazine | — | — | — | 0.01 |

EXAMPLE 2

The compositions set forth in Tables 1–6 above were tested on a paper transparentization line at a speed of up to 150 ft/min. with complete cure (under two 400 watt-/inch medium pressure UV lamps). A complete paper roll was first coated at speeds of up to 500 ft/min. The roll was allowed to reach saturation equilibrium, which took about thirty minutes. The paper was then passed under the UV lamps as mentioned above at a rate of 150 feet per minute. The resulting paper was uniformly saturated and showed no curling. Pencil markings were easily erased from the paper. The paper was used for reproducing drawings in the diazo blueprint process successfully. When the transparentized paper of the present invention was used in the diazo blueprint process instead of conventional paper, a faster machine speed was required.

The compositions of the present invention can be completely polymerized using UV doses as low as 0.2 to 0.5 joule/$cm^2$. The compositions of the present invention thus enable transparent papers to be produced at a lower energy cost. Since the compositions of the present invention also have lower viscosities, these compositions impregnate paper stock faster than prior art compositions. Thus, a faster, more energy efficient process for producing transparent paper is available by using the polymerizable liquid compositions disclosed herein to saturate the paper stock used in the process. Finally, the process disclosed herein does not require the use of an organic solvent, and, hence, the problems associated with handling solvents are eliminated by using the process disclosed herein.

All of the composition enumerated in Tables 1 through 6 have a low viscosity prior to being cured. The compositions cure rapidly when exposed to ultraviolet light and are only mildly odorous. The compositions saturate paper stock rapidly and are therefore suited for use in the process for transparentizing papers disclosed herein. The cured compositions exhibit good mechanical properties (e.g. flexibility, strength, etc.) and retain these properties over time. The compositions are very versatile. By changing the mole ratio of the polymerizable components in the composition, the composition can be tailored for use in a particular application.

The amount of liquid mixture impregnated into the paper stock determines the degree to which the resulting paper is transparent. The composition is then polymerized in situ on the paper stock by exposing the impregnated paper stock to ultraviolet light. The paper, thus cured, is at least semi-transparent.

The compositions of the present invention are also useful as a binder for fiberglass insulation. The compositions of the present invention are safer and more economical to use than the binders currently used. Binders currently used in fiberglass insulation contain urea-formaldehyde and thus exude toxic fumes when cured. The compositions of the present invention are solventless and therefore do not give off fumes when cured. A large cure oven is required to cure these urea-formaldehyde containing binders. Since the compositions of the present invention can be cured by exposing them to ultraviolet light, a cure oven is not required, making the curing process more energy efficient.

The compositions disclosed in Tables 1–6, particularly compositions V17–V19 in Table 6, can also be used to saturate paper for use in photocopying machines. Such saturated paper stock, when cured, can be used in photocopying machines without producing smoke or odor, such as that produced by conventional paper used in photocopying machines.

The examples and illustrations discussed herein are intended to highlight the more general concepts disclosed. The scope of the invention is defined by the claims appended hereto and is not to be construed as limited by the examples or detailed discussion set forth herein.

What is claimed is:

1. A composition for use in making transparent papers consisting essentially of:

a liquid maleate polyester that is made by reacting 1 mole of maleic anhydride with one mole of a monofunctional alcohol and then reacting the reaction product with a saturated diol to give a polyester that is end-capped with maleate functional groups; and at least one compound selected from the group consisting of:

a liquid vinyl monomer; a liquid vinyl oligomer; a liquid vinyl polymer; and an allyl functional compound.

2. The composition according to claim 1 wherein the maleate polyester has at least two maleate functional groups and wherein the theoretical molecular weight of the maleate polyester is about 400 to about 5000.

3. The composition according to claim 2 wherein the maleate polyester is a substantially linear molecule having two ends with one maleate functional group at each end of the molecule and wherein the theoretical molecular weight of the maleate polyester is about 400 to about 1000.

4. The composition according to claim 1 wherein the allyl functional compound is a triallyl cyanurate.

5. The composition according to claim 4 wherein the triallyl cyanurate is 2,4,5-triallyloxy-1,3,5-triazine.

6. The composition according to claim 1 wherein the vinyl monomer, oligomer or polymer is a vinyl ether or a vinyl ester.

7. The composition according to claim 6 wherein the vinyl ether is a divinyl ether of triethylene glycol.

8. The composition of claim 1 that further comprises a photoinitiator.

9. The composition according to claim 8 wherein the photoinitiator is a ketonic photoinitiator added in an amount of about 2 to about 10 parts by weight of the composition.

* * * * *